United States Patent
Sandstrom et al.

(10) Patent No.: US 6,752,611 B2
(45) Date of Patent: Jun. 22, 2004

(54) OPTICAL DISK MOLD TOOLING FOR REDUCED EDGE WEDGE

(75) Inventors: Chad R. Sandstrom, Stillwater, MN (US); Douglas R. Plourde, Somerset, WI (US); Dean E. Sitz, Wahpeton, ND (US); Donald J. Kerfeld, St. Paul, MN (US); John R. Johnson, Woodbury, MN (US)

(73) Assignee: Imation Corp., Oakdale, MN (US)

(*) Notice: Subject to any disclaimer, the term of this patent is extended or adjusted under 35 U.S.C. 154(b) by 104 days.

(21) Appl. No.: 10/001,099

(22) Filed: Nov. 15, 2001

(65) Prior Publication Data

US 2002/0058084 A1 May 16, 2002

Related U.S. Application Data

(62) Division of application No. 09/326,935, filed on Jun. 7, 1999, now abandoned.

(51) Int. Cl.[7] .............................................. B29D 11/00
(52) U.S. Cl. ....................... 425/143; 425/190; 425/547; 425/810
(58) Field of Search ................................ 425/143, 190, 425/547, 810; 264/106, 107

(56) References Cited

U.S. PATENT DOCUMENTS

| | | | |
|---|---|---|---|
| 4,540,541 A | * | 9/1985 | Harding .................... 264/328.2 |
| 4,992,336 A | | 2/1991 | Yamamoto et al. |
| 5,233,597 A | | 8/1993 | Nakayama et al. |
| 5,326,240 A | | 7/1994 | Kudo et al. |
| 5,458,985 A | | 10/1995 | Isono et al. |
| 5,460,763 A | | 10/1995 | Asai |
| 5,470,627 A | | 11/1995 | Lee et al. |
| 5,476,700 A | | 12/1995 | Asai et al. |
| 5,487,926 A | | 1/1996 | Kuribayashi et al. |
| 5,582,891 A | | 12/1996 | Murakami et al. |
| 5,597,613 A | | 1/1997 | Galarneau et al. |

(List continued on next page.)

FOREIGN PATENT DOCUMENTS

| | | |
|---|---|---|
| EP | 0 386 971 | 9/1990 |
| JP | 63-74618 | 4/1988 |
| JP | 2-134219 | 5/1990 |
| JP | 5-278088 | 10/1993 |
| JP | 9-295319 | 11/1997 |
| JP | 10-230524 | 9/1998 |
| WO | WO 98/47143 | 10/1998 |

OTHER PUBLICATIONS

Abstract and Machine Translation for JP 05–278088.*

*Primary Examiner*—Robert Davis
*Assistant Examiner*—Donald Heckenberg
(74) *Attorney, Agent, or Firm*—Eric D. Levinson

(57) ABSTRACT

An optical disk exhibiting no detrimental thickness increase (edge wedge effect) that arises at the outer diameter of an optical disk substrate during an injection molding manufacturing process, and an apparatus and method for making such a disk. The optical disk of the present invention is designed for use with an optical disk player, especially where the data on the optical disk is stored air incident. This optical disk includes a disk substrate made from a molded polymeric material. The disk substrate has a first major surface, a second major surface, and an outer edge. The first major surface of the optical disk includes a data region having an intermediate portion and an outer portion. The outer portion extends to the outer edge of the optical disk. The disk substrate has a thickness defined by the distance between the first major surface and the second major surface. The optical disk also includes an information layer covering the data region. In the present invention, the thickness of the intermediate portion of the data region is substantially equal to the thickness of the outer portion of the data region such that the outer portion of the data region is capable of being used by the optical disk player.

7 Claims, 15 Drawing Sheets

U.S. PATENT DOCUMENTS

| | | |
|---|---|---|
| 5,675,570 A | 10/1997 | Ohira et al. |
| 5,827,593 A | 10/1998 | Maruyama et al. |
| 5,893,998 A * | 4/1999 | Kelley et al. ............... 249/111 |
| 6,108,297 A | 8/2000 | Ohta et al. |
| 6,520,764 B1 * | 2/2003 | Ito et al. .................... 425/547 |

* cited by examiner

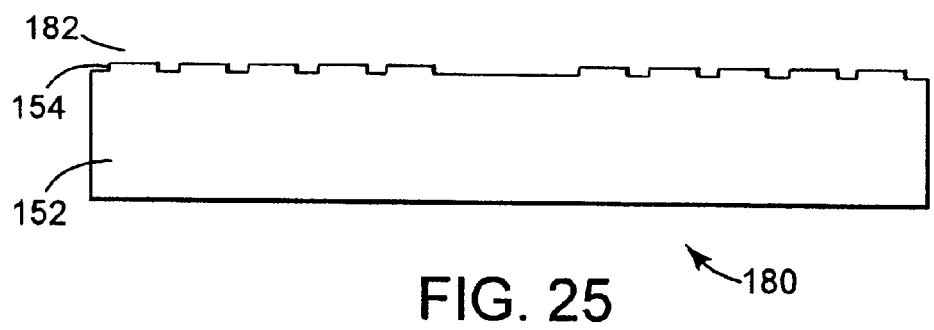

OPTICAL DISK MOLD TOOLING FOR REDUCED EDGE WEDGE

This application is a divisional application of U.S. Application Ser. No. 09/326,935, filed Jun. 7, 1999, now abandoned.

TECHNICAL FIELD

The present invention relates generally to the field of manufacture of optical data storage disks, and in particular, to a method and assembly for reducing or eliminating an increased thickness that occurs at the outer edge of an optical disk substrate as a result of the substrate molding process (otherwise known as the "edge wedge" effect).

BACKGROUND OF THE INVENTION

Data storage disks are produced using a disk replication process. A master disk is made having a desired surface relief pattern formed therein. The surface relief pattern is typically created using an exposure step (e.g., by laser recording) and a subsequent development step. The master is used to make a stamper, which in turn is used to stamp out replicas in the form of replica disk substrates as part of a disk molding process. As such, the surface relief pattern, information and precision of a single master can be transferred into many inexpensive replica disk substrates.

Conventional mold assemblies typically include a fixed side and a moving side. The stamper is typically attached to either or both sides of the mold assembly for replicating a desired surface relief pattern (i.e., lands, grooves and/or pits) into the replica disk substrate. A movable gate cut may be provided for cutting a central opening in the replica disk substrates. The stamper may be secured to the moving side using an inner holder and outer holder, wherein the inner holder and outer holder fit over the stamper. Several more tooling parts may be located at the center of the mold assembly to assist in ejection of the component.

During the disk molding process, a resin, typically optical grade polycarbonate, is forced in through a sprue channel into a substrate cavity within the mold assembly to form the replica disk substrate. The surface relief pattern or formatted surface is replicated in the replica disk substrate by the stamper as the cavity is filled. After filling, the gate cut is brought forward to cut a center hole in the replica disk substrate. After the replica disk has sufficiently cooled, the mold assembly is opened and the gate cut and a product eject may be brought forward for ejecting the formatted replica disk substrate off of the stamper. The inner holder and outer holder may be removable to allow changeout of the stamper.

In injection-compression molding, while the resin is forced into the substrate cavity of the mold assembly by the molding press, injection pressure overcomes clamp force causing mold to open a small amount (commonly termed "mold blow"). Pressure is then increased to the mold assembly to clamp the mold shut, forcing the resin into the microscopic surface relief pattern of the stamper (which contains the reverse image of the desired replica disk surface relief pattern). Thus, the above process is commonly termed "injection compression" or "micro-coining".

For disk formats utilized in flying head applications, as disk capacity increases the design tolerances for the desired surface relief pattern become more critical. For high capacity disks the flying heads may be required to pass closer to the disk substrate, requiring tighter disk specifications, including a reduction or elimination of disk surface geometry imperfections.

One such disk surface geometry imperfection is the thickness increase that has been consistently seen at the outer edge of a typical polymeric optical disk substrate. This phenomenon has been given the name "edge wedge" or "ski jump" effect. This "edge wedge" is shown schematically in prior art FIG. 1 and FIG. 2. "Edge wedge" causes problems in a hard disk-type system where a read/write head is designed to fly as close as possible (i.e., on the order of 1–5 micro-inches) to the surface of the media substrate. For example, one typical polycarbonate disk substrate has an average thickness of about 2 mm (as shown at T1), and a radius of 65 mm. The "edge wedge" effect is primarily seen at the outer radius region of the polycarbonate disk between 62 mm and 65 mm, where the maximum substrate thickness (i.e., bump height) T2 at radius 65 mm is approximately 10–20 microns thicker than the substrate thickness at radius 63 mm. When the bump height differential (T2–T1) divided by the average thickness (T1) exceeds 0.01 (1 percent), read/write flyability problems are often encountered.

The "edge wedge" phenomenon can be attributed to many factors. During cooling of the disk substrate in the mold, the plastic "freezes" at different rates in different radii of the part. The outer edge of the disk substrate freezes through the thickness faster due to its contact with the cold outer holder. Other factors include the tendency of the disk substrate material molecules to be in substantial radial alignment near the center of the disk substrate, and relatively misaligned near the outer edge due to the mold filling process. All of these factors result in the outer edge of the disk substrate exhibiting a greater thickness than the remainder of the disk substrate.

The "edge wedge" phenomenon can be further described as follows. When the optical disk substrate is molded in the micro-coining process described earlier, the densification that is associated with the cooling plastic is accommodated through a corresponding reduction in the mold cavity size (as opposed to reduction in mold cavity pressure as in conventional injection molding). During the filling phase, the mold halves are forced slightly apart by the fluid pressure applied from the injection unit. As the plastic in the mold cools, it shrinks, and the mold halves translate into closer proximity as the press maintains a constant clamp force or pressure on the solidifying melt. The part will freeze through the thickness at slightly different rates at different radii. Regions that are frozen fully through early will do so while the mold is blown to a greater extent or whilst the cavity z-dimension is larger in the earlier phases of the micro-coining molding process. These fully frozen regions will then strain due to clamp force in an elastic fashion (meaning that the solid material will spring back upon release of applied force). Regions that remain liquid at the center will strain in a viscous fashion (this is non-recoverable strain) and will continue to shrink in size or density as they more slowly solidify and eventually take on a thickness of a smaller cavity dimension from later in the coining/cooling process. Therefore, after the clamping force is removed, the early-freezing regions (outer circumference areas) will spring back to a larger thickness than those areas that froze completely through later in the process (the inner disk area).

For a traditional optical disk, where information is stored "substrate incident" the "edge wedge" effect does not present a major problem. In substrate incident applications, a transparent protective layer covers the information layer of the disk. An optical disk player including a laser light source positioned away from the disk surface, focuses a laser beam through the protective layer at the information layer to access (i.e., read) the data stored on the disk. However, for "flying head" applications where information is stored on a disk surface (i.e., where information is stored "air incident"), a read/write head is flying 1–2 micro-inches above the substrate surface. The "edge wedge" phenomena is associated with a loss of flyability of the read/write head where the outer edge of the head comes into contact with the rising surface of the media substrate, resulting in a "head crash" if the head were allowed to fly over the outer portion of the disk. The outer edge of the disk is unusable for data storage, since the curvature of the surface becomes too great to provide a functional air bearing between the head and the surface of the disk. This limits the capacity, functionality and robustness of the disk data storage system.

Unfortunately, the outer circumference of the disk substrate where the "edge wedge" effect occurs is also the most desirable area for data storage. This outer circumference provides a large area for data storage since the data tracks are larger. Therefore, the need exists to eliminate the "edge wedge" to prevent disk crashes and to increase the useable area of the disk.

SUMMARY OF THE INVENTION

The present invention discloses an optical disk exhibiting no detrimental thickness increase (edge wedge effect or curvature) that arises at the outer diameter of an optical disk substrate during a typical injection molding manufacturing process, and an apparatus and method for making such a disk.

The present invention provides an optical disk for use with an optical disk player, where the data on the optical disk is stored air incident. This optical disk includes a disk substrate made from a molded polymeric material. The disk substrate has a first major surface, a second major surface, and an outer edge. The first major surface of the optical disk includes a data region having an intermediate portion and an outer portion. The outer portion extends close to the outer edge of the optical disk. The data region is defined by a plurality of lands and grooves, where the disk substrate has a thickness defined by the distance between the lands and the second major surface. The optical disk also includes an information layer covering the data region. In the present invention, the thickness of the intermediate portion of the data region is substantially equal to the thickness of the outer portion of the data region such that the outer portion of the data region is capable of being used by the optical disk player.

In a preferred embodiment of the present invention, the molded polymeric material is a polycarbonate or a polycarbonate blend. In order to prevent a flying read/write head from crashing on the surface of the optical disk, the thickness of the intermediate portion and the thickness of the outer portion of the optical disk varies less that 0.10 micron per millimeter proceeding radially from the center axis of the disk substrate. In one embodiment of the present invention, the outer portion of the optical disk extends radially from approximately 5 millimeters in from the outer edge of the disk substrate to the outer edge of the disk substrate, where the disk substrate has a diameter of between 120 and 130 millimeters.

The present invention also provides a disk molding apparatus for forming an optical disk in a disk molding process, wherein the apparatus reduces the edge wedge effect in the molded optical disk. In a first embodiment, the disk molding apparatus includes a disk substrate cavity for forming a disk substrate. The disk substrate cavity has a first major surface, a second major surface which opposes the first major surface, and an outer edge. The disk molding apparatus also includes a channel mechanism connected with the disk substrate cavity for allowing disk molding material to enter the disk substrate cavity. The disk molding apparatus further includes a stamper located on one side of the disk substrate cavity for forming a formatted surface relief pattern in the disk substrate. Finally, the disk molding apparatus also includes a thermal inhibiting mechanism located around the outer edge of the optical disk. This thermal inhibiting mechanism inhibits heat flow from the disk substrate during the cooling of the disk molding material to form the disk substrate.

The thermal inhibiting mechanism of the first embodiment includes an outer holder, wherein the outer holder removably secures the stamper to the first major surface. In one preferred embodiment, the outer holder is made of low thermoconductivity titanium. In another preferred embodiment, the outer holder has two ring members, wherein a low thermoconductivity ceramic member is retained between the two ring members, and a portion of the ceramic member extends from the two ring members for retaining the stamper against the first major surface.

In one embodiment, the thermal inhibiting mechanism of the present invention is a heating mechanism, where the heating mechanism heats the outer holder during the disk molding process to a temperature sufficient to create a smaller temperature differential between the disk substrate and the outer holder, reducing the heat transfer between the disk substrate and the outer holder. This heating mechanism of the present invention has several embodiments, including: a resistive heater placed within a channel of the outer holder; heated water circulating through the channel of the outer holder; heated oil circulating through the channel of the outer holder; a film resistive heater coupled to an outer surface of the outer holder; and an induction heater positioned external to the outer holder.

In a second embodiment of the present invention, the disk molding apparatus has a disk substrate cavity which includes a defined wedge containment area where the wedge is directed into during the injection molding process. The disk substrate cavity incorporating the wedge containment area has a surface area less than the surface area of a conventional disk substrate cavity without the wedge containment area. By directing the wedge into a confined area, the area of the disk substrate affected by the edge wedge effect is reduced, resulting in a greater usable data storage area within the optical disk.

In a third embodiment of the present invention, the disk molding apparatus includes a disk substrate cavity for forming a disk substrate. The disk substrate cavity includes a first major surface, a second major surface opposite the first major surface, and an outer edge. The disk molding apparatus also includes a channel mechanism in fluid communication with the disk substrate cavity which allows disk molding material to enter the disk substrate cavity. Finally, the disk molding apparatus includes a stamper, having an information surface and a back surface. The information surface of the stamper forms the first major surface of the disk substrate cavity, and produces a formatted surface relief pattern in the disk substrate during the molding process. Also, during the molding process, the stamper forms a shape which counters the molding edge wedge effect.

In order to counter the edge wedge effect during the molding process, the back surface of the stamper is electroplated with a nickel lip around the outside perimeter, such that as pressure is applied to the back surface of the stamper, the stamper flexes in a concave fashion producing a disk substrate cavity thickness which is narrower at the outside perimeter and wider in all other areas, thus creating an anti-wedge region within the disk substrate cavity. In a preferred embodiment, the nickel lip around the outside perimeter of the back side of the stamper is approximately 3 mm wide, and approximately 15 microns thick. The resultant anti-wedge region within the disk substrate cavity is approximately 15 microns narrower than all other areas of the disk substrate cavity.

The present invention also discloses methods for forming an optical disk in a disk molding process which reduces the edge wedge effect in the molded optical disk. The first such method begins by injecting molding material into a disk substrate cavity via a channel mechanism. The disk substrate cavity includes a first major surface, a second major surface opposite the first major surface, and an outer edge. Next, a thermal inhibiting mechanism located about the outer edge of the disk substrate cavity inhibits the escape of heat in the radial direction from the disk substrate during the cooling of the disk molding material. The thermal inhibiting mechanism includes a low thermal conductivity outer holder. In one preferred embodiment the outer holder is constructed of titanium. In another preferred embodiment, the outer holder includes a ceramic member which contacts the disk substrate during the molding process. In yet another embodiment, the outer holder includes a heating mechanism, wherein the heating mechanism heats the outer holder during the disk molding process to a temperature sufficient to create a smaller temperature differential between the disk substrate and the outer holder, thus reducing the heat transfer between the disk substrate and the outer holder.

The present invention also discloses a second method for forming an optical disk in a disk molding process which reduces the edge wedge effect in the molded optical disk. In this second method, the disk molding process utilizes a disk substrate cavity having a defined wedge containment area located at the outer perimeter of the disk substrate cavity. Initially, disk molding material is injected into a disk substrate cavity via a channel mechanism. Next, the disk molding material in the disk substrate cavity is compressed such that the disk molding material at the outer perimeter of the disk substrate cavity flows into the defined wedge containment area. The disk molding material is then cooled such that the optical disk is formed within the wedge containment mold. In the resultant disk, the unusable surface area is minimized.

The present invention also discloses a third method for forming an optical disk in a disk molding process which reduces the edge wedge effect in the molded optical disk. This third method utilizes a disk substrate cavity having a first major surface, a second major surface opposite the first major surface and an outer edge. This method also utilizes a stamper having an information surface and a back surface. The information surface of the stamper forms the first major surface of the disk substrate cavity. The back surface of the optical stamper is electroplated with a nickel lip at the outside perimeter.

This third method begins by injecting molten disk molding material into the disk substrate cavity. Next, the disk molding material is compressed in the disk substrate cavity. As pressure is applied to the stamper, a formatted surface relief pattern is formed in the disk substrate from the information surface of the stamper. Also, as pressure is applied to the back surface of the stamper, the stamper flexes to form an anti-wedge region in the disk substrate cavity which counters the molding edge wedge effect during the disk molding process. In a preferred embodiment, the nickel lip around the outside perimeter of the back side of the stamper is approximately 3 mm wide and 15 microns thick. The resultant thickness of anti-wedge region in the cavity is approximately 15 microns less than in all other areas of the cavity.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein:

FIG. 25 illustrates a molded substrate formed from the anti-wedge stamper, wherein the "edge wedge" effect has been eliminated.

DETAILED DESCRIPTION

Figure 3:
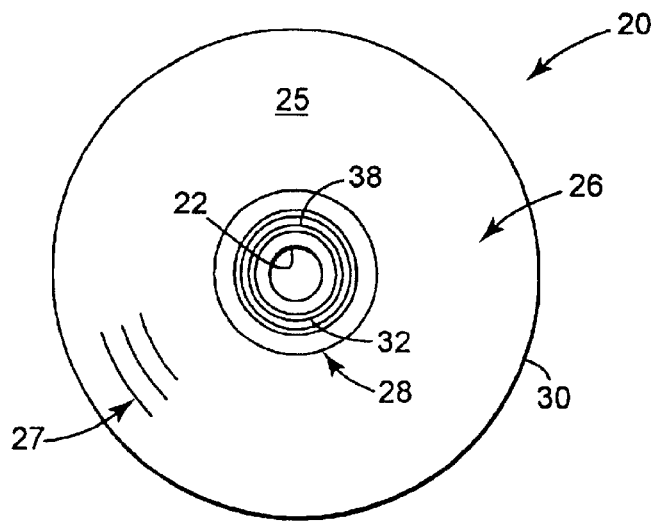
FIG. 3 is a plan view of an optical disk in accordance with the present invention.

FIG. 3 is plan view of one exemplary embodiment of an optical disk 20 in accordance with the present invention. The optical disk may be a read only or a writable optical disk. Optical disk 20 is round or generally "disk shaped", and may include an opening 22 centrally located and extending therethrough. The optical disk 20 includes a disk substrate 24 having information layer 25. The disk 20 includes an information area 26 and a central region 28. The central region 28 may be located between the information area 26 and the opening 22.

In one exemplary embodiment shown in FIG. 3, data is stored air incident (i.e., on the disk surface) within the information area 26 of optical disk 20. The information area 26 includes a surface relief pattern which can be defined as a series of grooves bored within a plane of higher "lands" indicated at 29 (shown enlarged for clarity). The microscopic grooves are formed on the surface of the plastic disk during an injection molding process in accordance with the present invention which is described in detail further in the specification. The grooves on optical disk 20 are arranged in a spiral track originating at the beginning of information area 26, adjacent central region 28, and ending at the disk outer edge 30.

Data (i.e., information) is stored in/on the information layer 25 covering (e.g. deposited) over the disk surface. In one preferred embodiment, the information layer 25 comprises magnetizable material. The data is stored as magnetic transitions within the information layer and readable by an optical disk player. Conventionally, the spiral track can be defined as a plurality of generally concentric tracks, wherein each generally concentric track is a cycle of the spiral track. Alternatively, the information area may consist of a plurality of concentric tracks. Similarly, for writable optical disks, such as magneto optical disks or phase change optical disks, the data is encoded within the readable material arranged in a spiral track. In particular, the writable disks may include a spiral or concentric track formed in the disk substrate, wherein the data is encoded in the writable material located in the regions between the spiral track cycles (e.g., on top of the lands).

The central region 28 can include a hub 32 positioned at opening 22. The hub 32 is employed to aid in engagement or mating of the optical disk within an optical disk player (in particular, the drive spindle located within the optical disk player) for retention and rotation of the disk curing operation of the optical disk player. Further, hub 32 is centered on optical disk 20 using a centering process. In particular, the concentricity of the formatted information located within the information area 26 can be specified relative to the hub center hole 33. Typically, the center hole 33 serves to center an optical disk player drive mechanism to the formatted surface (information) on the disk (or more particularly, the generally concentric tracks). An information layer is deposited on the disk substrate surface.

Figure 4:
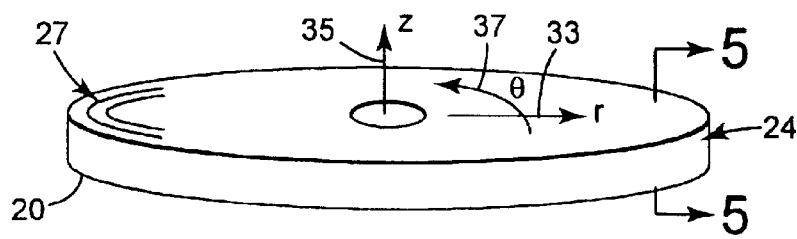
FIG. 4 is a side view of an optical disk in accordance with the present invention including illustrating of a coordinate frame of reference.

FIG. 4 is a side view of optical disk 20 showing a coordinate frame of reference. The coordinate frame of reference is used for the purposes of discussing embodiments of the invention disclosed herein. In this coordinate frame of reference, a first vector 35 projects vertically from the center of optical disk 20 in a z-direction, while a second vector 33 projects horizontally from the center of optical disk 20 in an redirection, toward an outer perimeter of optical disk 20. Angle θ, shown at 37, is formed between first vector 35 extending vertically and second vector 33, extending horizontally.

In one preferred embodiment, disk substrate 24 of optical disk 20 is formed using a disk molding process. Disk substrate 24 is typically made of a moldable polymeric material or polymer blend which in one preferred embodiment is polycarbonate or a polycarbonate blend. Other known disk substrate materials include polymethylmethacrylate (PMMA), polymethylpentene, co-polymers, or blends of polycarbonates or other polymers, "polymer z", etc. Other suitable disk substrate molding materials will become apparent to those skilled in the art after reading the disclosure of the present invention.

Figure 5:
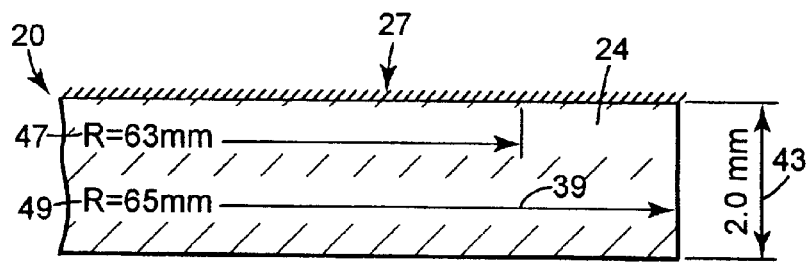
FIG. 5 is an enlarged, cross sectional view of the outer perimeter region of an optical disk substrate in accordance with the present invention illustrating the absence of an "edge wedge" effect.

FIG. 5 is an enlarged, cross sectional view of the outer perimeter region of an optical disk 20 in accordance with the present invention, illustrating the absence of an increased thickness at outer edge 30 or "edge wedge" effect. In the illustrated exemplary embodiment, optical disk 20 has a radius 49 of approximately 65 mm. Proceeding horizontally from the center of optical disk 20 in the r-direction from radius 0 mm to 65 mm, the thickness of optical disk 20 remains substantially uniform at approximately 2.0 mm (i.e., thickness T1). In other embodiments, the thickness T1 of other optical disks 20 ranges from about 1 mm to about 2.5 mm. In one application, in order to maintain head flyability (of the disk player), the thickness of optical disk 20 cannot vary more than 1 micron per millimeter proceeding radially from the center of optical disk 20. This is in contrast to a prior art optical disk (FIG. 2), where proceeding horizontally from radius 63 mm to radius 65 mm results in a thickness of approximately 10–20 microns greater than the average thickness T1 (i.e., maximum thickness T2). In other embodiments the thickness differential (T2–T1) between the maximum thickness (T2) of optical disk 20 and the average thickness (T1) of the optical disk varies from 0.01 millimeter to 0.025 millimeter. When (T2–T1)/T1 exceeds 0.01, flyability of the read/write head may be adversely effected. By eliminating the "edge wedge" effect found in prior art molded optical disks, an air incident, flying read/write head can now traverse the entire surface of optical disk 20 without crashing. Also, since the entire surface of optical disk 20 can now be traversed by the flying read/write head, substantially more surface area is available for data storage on the surface of optical disk 20.

One method for reducing the "edge wedge" effect found at the outer diameter of optical disk 20 is to mold an oversized optical disk 20, then cut away the region at the outer edge 30 of the disk where the "edge wedge" effect occurs. As an example, an oversized optical disk of approximately 134 mm is molded by the injection molding apparatus illustrated in FIG. 6. As described above, the "edge wedge" effect primarily occurs at the outer 2 mm of the outer diameter of the optical disk 20.

In a preferred embodiment, a cylindrical cutting guide having a diameter of approximately 130 mm is centrally positioned on the oversized optical disk. Cylindrical cutting guide positions a cutting apparatus such that a 130 mm diameter optical disk may be cut from the oversized 134 mm diameter optical disk. Cylindrical cutting guide is tightly positioned on the surface of the oversized 134 mm diameter optical disk such that excess material produced by the cutting apparatus is isolated from the resultant 130 mm diameter optical disk. The cutting apparatus removes substantially all of the edge wedge effect found at the outer diameter of the oversized 134 mm diameter optical disk, producing a normal sized 130 mm diameter optical disk with minimal a unusable outside diameter which corresponds to the width of the cutting guide.

Figure 6:
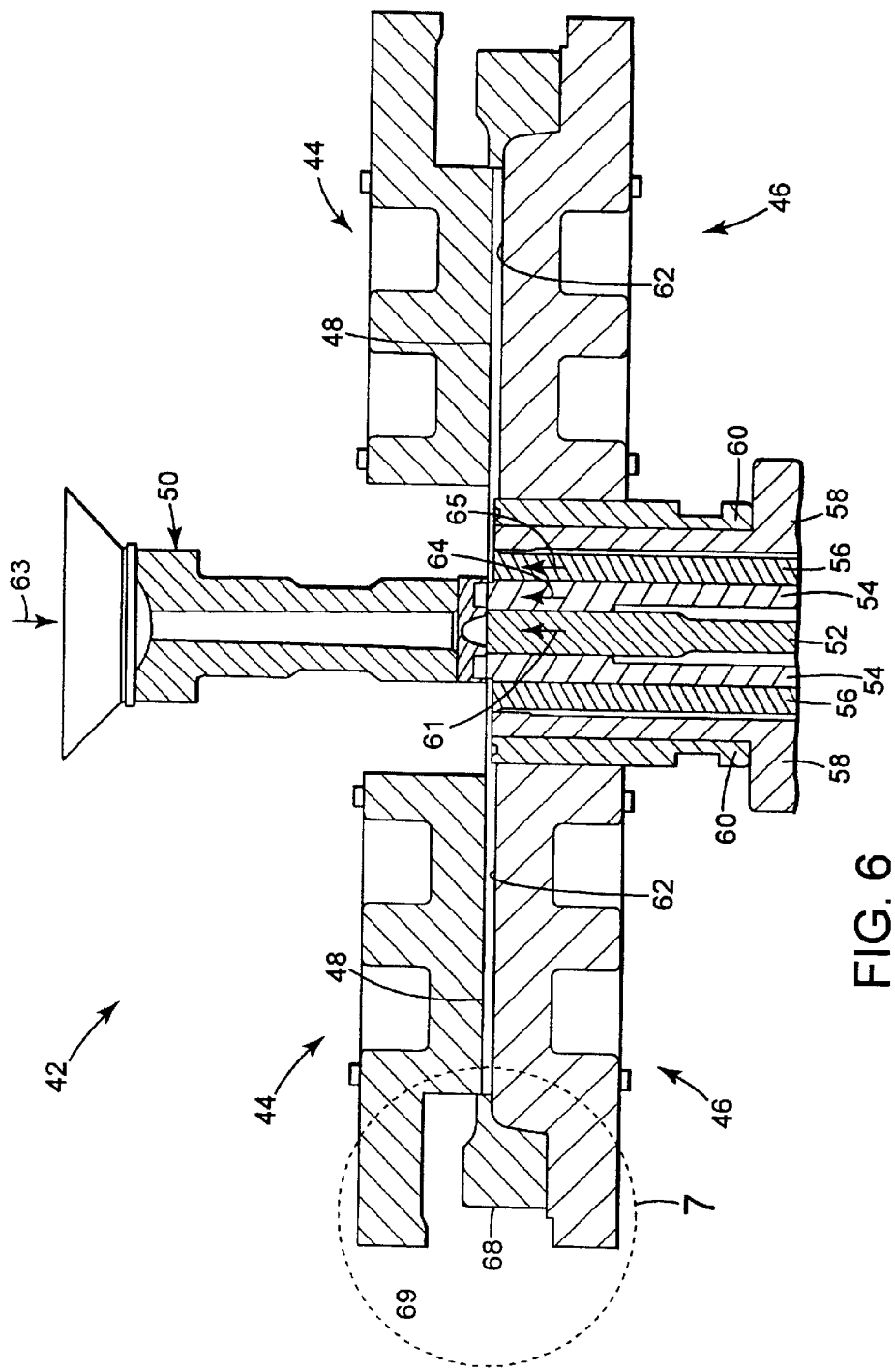
FIG. 6 is a cross sectional view illustrating one exemplary embodiment of an injection molding apparatus used in the manufacture of an optical disk in accordance with the present invention.

FIG. 6 is a cross sectional view of an injection molding apparatus 42 used in the manufacture of an optical disk 20 in accordance with the present invention. The injection molding apparatus 42 is used for molding replicas of optical disk 20 in a disk molding process. The injection molding molding apparatus 42 is part of a complete optical disk molding manufacturing process, which can be a process for manufacturing optical disk made from a molded polymeric material (e.g., CD-ROM, DVD, MO, or phase change optical disks) in accordance with the present invention. The injection molding apparatus 42 generally includes a fixed side 44 and a moving side 46. The fixed side 44 is movably coupled to the moving side 46 to form a disk substrate cavity 48. A sprue channel 50 is provided for allowing material for forming the substrate 24, such as a polycarbonate resin, to enter disk substrate cavity 48.

The moving side 46 includes a sprue eject 52, a gate cut 54, a product eject 56, a rod cover 58, an inner holder 60, a stamper 62 and an outer holder 68. Sprue eject 52 is utilized for ejection of sprue 50 during opening of the injection molding apparatus. Gate cut 54 is utilized for cutting the opening 22 within the optical disk 20. Project eject 56 is utilized for ejecting the finished product replica optical disk 20 from the injection molding apparatus. Inner holder 60 and outer holder 68 are removable for changing out and securing stamper 62. Rod cover 58 is stationary within the moving side 46 to constrain the positions of the adjacent movable parts product eject 56 and the inner holder 60. Stamper 62 is utilized for forming the formatted surface on surface relief pattern 29 into optical disk substrate 24.

Injection molding apparatus 42 further includes a thermal inhibiting mechanism 69, which in the exemplary embodiment shown, includes outer holder 68. Thermal inhibiting mechanism 69 operates to inhibit heat flow from the outer edge of the disk substrate during cooling of the disk molding material, thereby reducing or eliminating the "edge wedge" effect. In one preferred embodiment, thermal inhibiting mechanism 69 has a low thermal conductivity rating and is made of low thermal conductivity materials. In one preferred embodiment the thermal inhibiting mechanism has a thermal conductivity in the range of 0.1 to 2 BTU/hr/ft/F, and more preferably is less than 5 BTU/hr/ft/F. Alternate embodiments of thermal inhibiting mechanism are described in detail later in the specification.

The process for molding optical disk substrate 22 in accordance with the present invention includes filling the disk substrate cavity 48 with a disk molding material, such as polycarbonate resin, through the sprue 50 channel (indicated at 63). After the resin is forced into the disk substrate cavity, but before cooling of the resin, the gate cut 54 is operated forward, indicated by arrow 64, to cut opening 22 within the optical disk substrate. After cooling of the resin within the disk substrate cavity 48, the formatted surface 34 has been embossed in optical disk substrate 22, and the injection molding apparatus 42 is opened. The sprue eject 56 is operated forward (indicated by arrow 61). At the same time, the product eject 56 is operated to remove or eject the molded disk substrate 24 from the injection molding apparatus 42 surface (specifically, the surface of the moving side 46), indicated at 65. During this process, the rod cover 58 remains stationary. The above process is repeated for the manufacture of each additional optical disk (or replica optical disk) substrate. Optical disk substrate 22 then passes through a finishing process for forming additional layers over the disk substrate to form information layer 26, such as reflective or recording layers, and in the case of CD-ROM, protective layers, depending on the type and use of the optical disk.

Figure 7:
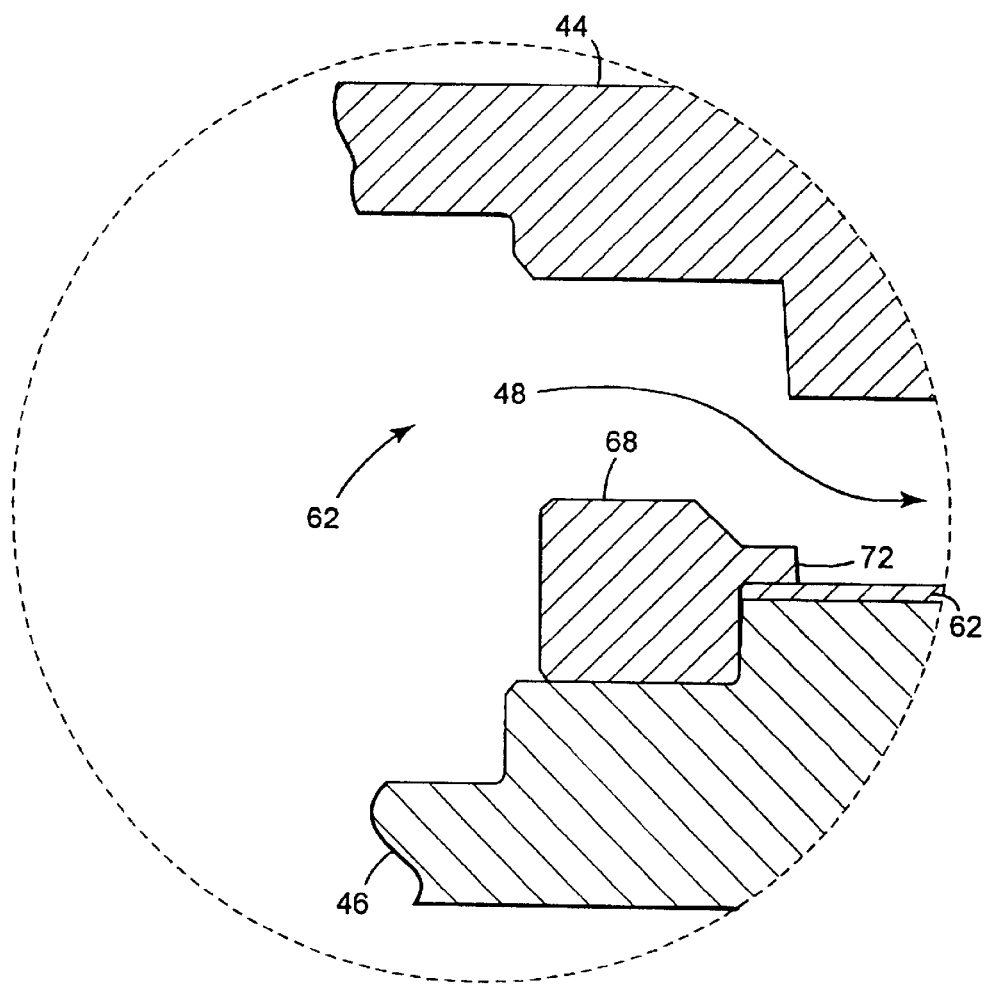
FIG. 7 is an enlarged partial cross-sectional view of the outer perimeter of the injection molding apparatus of FIG. 6, illustrating the engagement of a stamper by an outer holder.

FIG. 7 is an enlarged partial cross-sectional view of one exemplary embodiment of the outer perimeter of the mold disk substrate cavity 48 of FIG. 6, showing one exemplary embodiment of a thermal inhibiting mechanism 69 in accordance with the present invention, which includes outer holder 68 made of a low thermal conductivity material. Outer holder 68 is positioned at the outer perimeter of stamper 62 such that outer holder 68 securely holds stamper 62 in place during the disk substrate molding process. Data holder 68 is removable for changeout of stamper 62. Outer holder 68 is also positioned such that an edge 72 of outer holder 68 contacts the molten polycarbonate forming optical disk 20 during the injection molding process.

Outer holder 68 plays a critical role in the formation of optical disk 20. As mentioned above, in prior art disk molding apparatus, the "edge wedge" effect 41 present on optical disk 20 is attributable to several factors present during the injection molding process as previously described herein. One such factor is that the molten polycarbonate forming optical disk 20 freezes at different rates at different radii of the part during the cooling time process in mold cavity 48. The outer edge of the optical disk 20 substrate freezes through the thickness first of all due to its contact with the colder outer holder. Thereby, the outer edge of optical disk 20 exhibits a greater thickness than the remainder of the optical disk 20 surface. The outer holder 68 in accordance with the present invention operates to eliminate or reduce the edge wedge effects.

Figure 8:
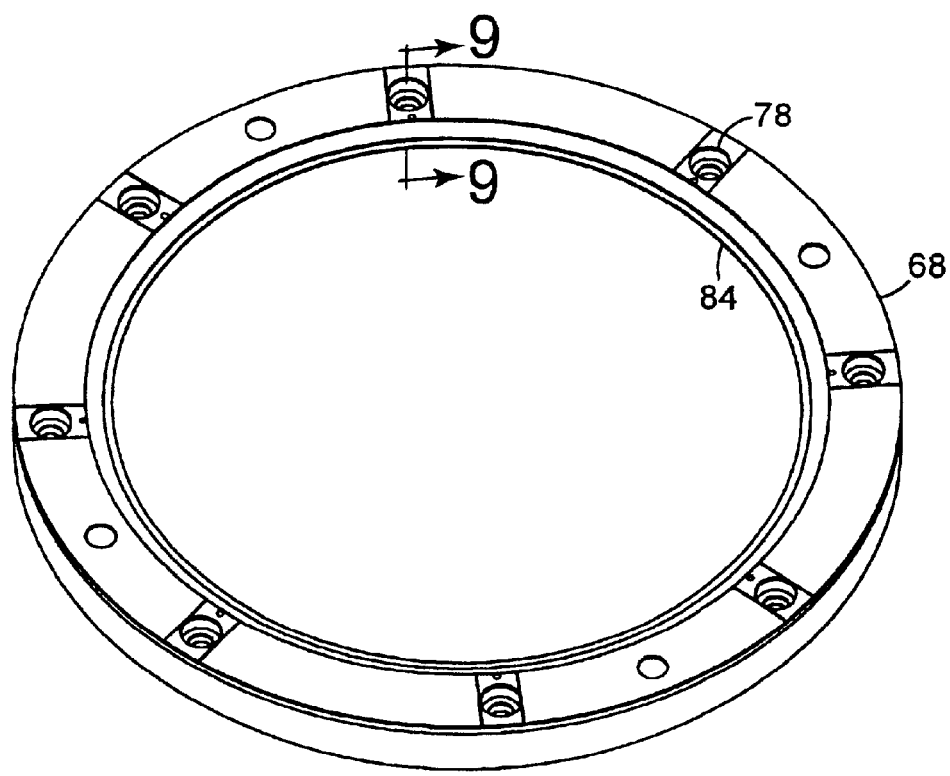
FIG. 8 is a top view of one exemplary embodiment of an outer holder component of the injection molding apparatus in accordance with the present invention.
Figure 9:
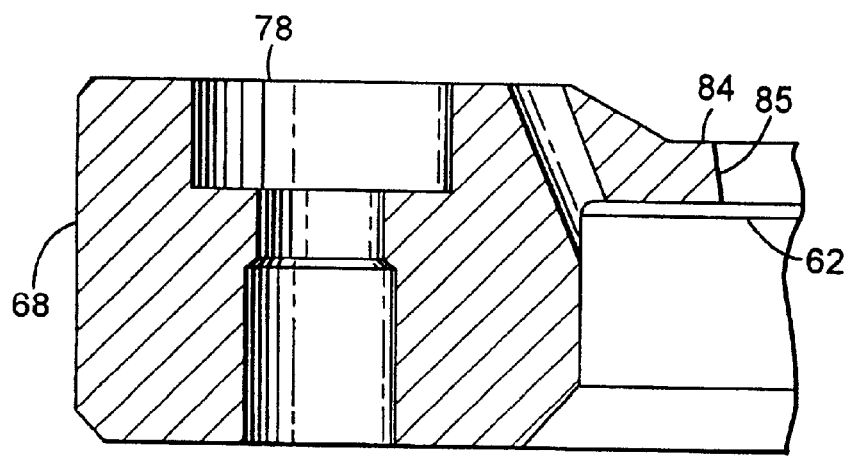
FIG. 9 is an enlarged, partial cross-sectional view of the one-piece titanium outer holder component of FIG. 8, illustrating the interaction between the outer holder and the stamper component.

FIG. 8 is a top view of a single piece outer holder 68 of the injection molding apparatus 42, in accordance with the present invention, and FIG. 9 is an enlarged, partial cross-sectional view of a single piece outer holder 68, illustrating the interaction between outer holder 68 and stamper 62 wherein outer holder 68 is made of a material exhibiting low thermal conductivity properties.

Outer holder 68 illustrates one exemplary embodiment of a specific implementation of the generalized outer holder 68, as described in FIG. 7. In one preferred embodiment, outer holder 68 is formed of titanium. Titanium outer holder 68 has a plurality of mounting holes 78 formed therethrough. Mounting holes 78 accommodate fastening devices, such as screws, which affix outer holder 68 to injection molding apparatus 42. Outer holder 68 has a lip 84 which rests over the top surface of stamper 62 to hold stamper 62 in place. Lip 84 of outer holder 68 also provides a contact surface 85, which contacts the molten polycarbonate during the injection molding process.

In the illustrated embodiment, outer holder 68 is designed to limit the heat flow from the molten polycarbonate forming optical disk 20 to outer holder 68. This is accomplished by using a low thermoconductivity tooling material in the construction of outer holder 68. In the illustrated embodiment, this material is titanium. Table 1 gives the thermal conductivity for a number of tooling steels:

TABLE 1

CONDUCTIVITY OF SELECTED MATERIALS

| Material | Conductivity (BTU/hr/ft/F) |
|---|---|
| Aluminum | 119 |
| Copper | 222 |
| Hardwood | 0.10 |
| Tool Steel | 21 |
| Titanium | 3.9 |
| AREMCO Macor Ceramic | 0.97 |

As can be seen from Table 1, titanium has a conductivity that is considerably lower than that of typical tool steels used in components of this nature. The lower thermal conductivity of outer holder 68 made from titanium causes the molten polymeric material (preferably polycarbonate) to conduct heat away to the outer holder at a rate that is approximately 30 percent lower than typical tooling steels. Thus, by using an outer holder 68 made of low thermoconductivity titanium, "edge-wedge" effect 41 in optical disk 20 can be reduced or eliminated. Other low thermal conductivity materials useable for forming outer holder 68 will become apparent to those skilled in the art after reading the disclosure of the present invention.

Figure 10:
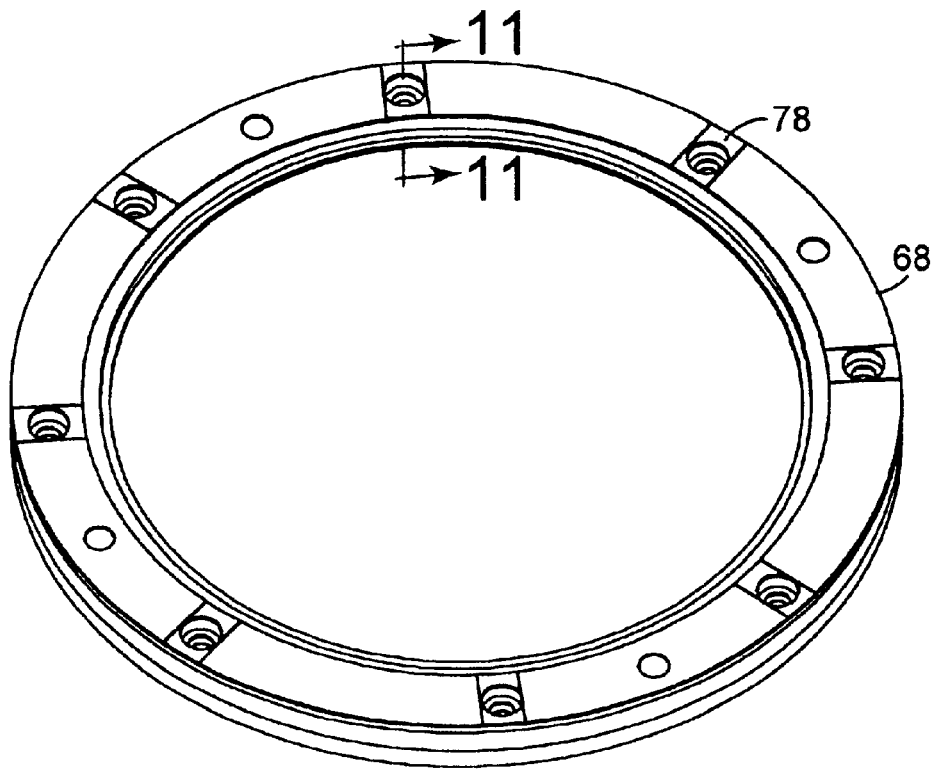
FIG. 10 is a top view illustrating another exemplary embodiment of outer holder used within the injection molding apparatus of the present invention, wherein at least one piece of the outer holder is a low thermoconductivity component.
Figure 11:
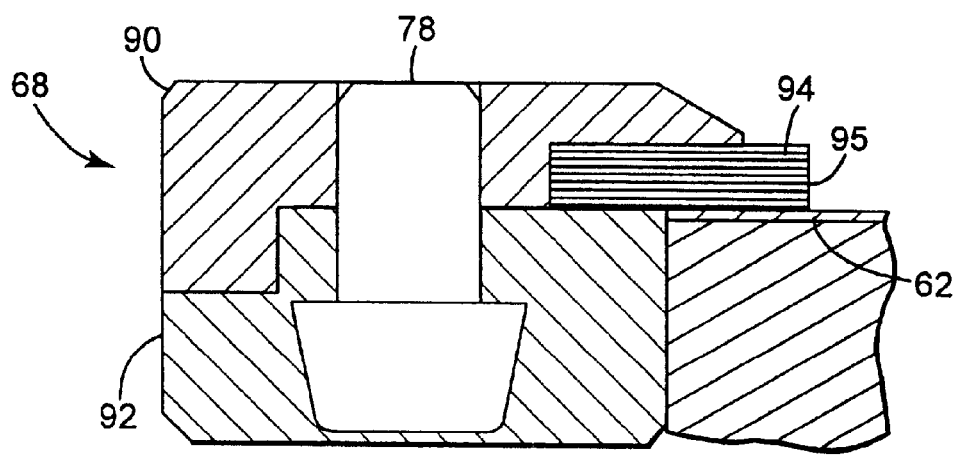
FIG. 11 is an enlarged, partial cross-sectional view of the outer holder of FIG. 10.

FIG. 10 is a top view of a three piece outer holder 68 used within the injection molding apparatus 42 of the present invention, wherein one piece of the outer holder is a low thermoconductivity ceramic component 94. FIG. 11 is an enlarged, partial cross-sectional view of the three-piece outer holder 68, wherein one piece of the outer holder is a low thermoconductivity ceramic component 94.

Three-piece outer holder 68 of the illustrated embodiment is a specific implementation of the generalized outer holder 68, as described in FIG. 7. Three piece outer holder 68 has a low thermoconductivity ceramic insert 94 nestled into a pocket formed by an upper ring member 90 and a lower ring member 92 (i.e., retained between member 90 and member 92). Outer holder 68 has a plurality of mounting holes 78 formed therethrough. Mounting holes 78 accommodate fastening devices, such as screws, which affix outer holder 68 to injection molding apparatus 42. Ceramic insert 94 forms a lip which rests over the top surface of stamper 62 to hold stamper 62 in place. Ceramic insert 94 of outer holder 68 also provides a contact surface 95 which contacts an edge of the molten polycarbonate during the injection molding process.

Figure 1:
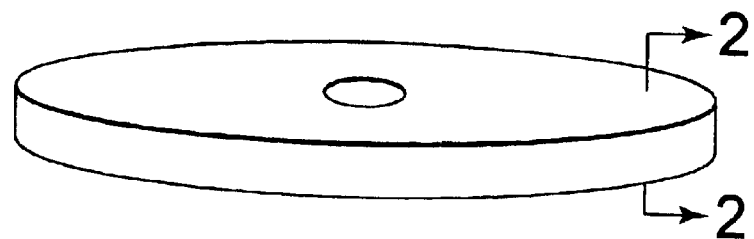
FIG. 1 is a side view of a prior art optical disk substrate.
Figure 2:
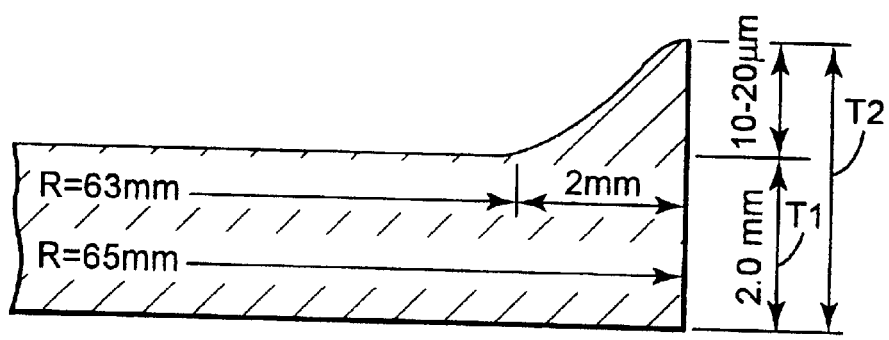
FIG. 2 is an enlarged, cross sectional view of the outer perimeter region of a prior art optical disk substrate showing an "edge wedge" effect.

In the illustrated embodiment, three-piece outer holder 68 is designed to limit the heat flow from the molten polycarbonate forming optical disk 20 to outer holder 68. This is accomplished by using a low thermoconductivity tooling material in the construction of outer holder 68. In one preferred embodiment shown, this material is AREMCO Macor ceramic. Ceramic is typically not found in injection molds as it is relatively harder to work with to create precision shapes. In the present invention, this difficulty is surmounted by integrating a simple ring shaped ceramic insert 94 into three-piece outer holder 68. As the outer perimeter of optical disk 20 is formed from the molten polycarbonate within injection molding apparatus 42, the molten polycarbonate encounters ceramic insert 94, and heat flow in the redirection (as shown in FIG. 2) is vastly decreased.

Figure 12:
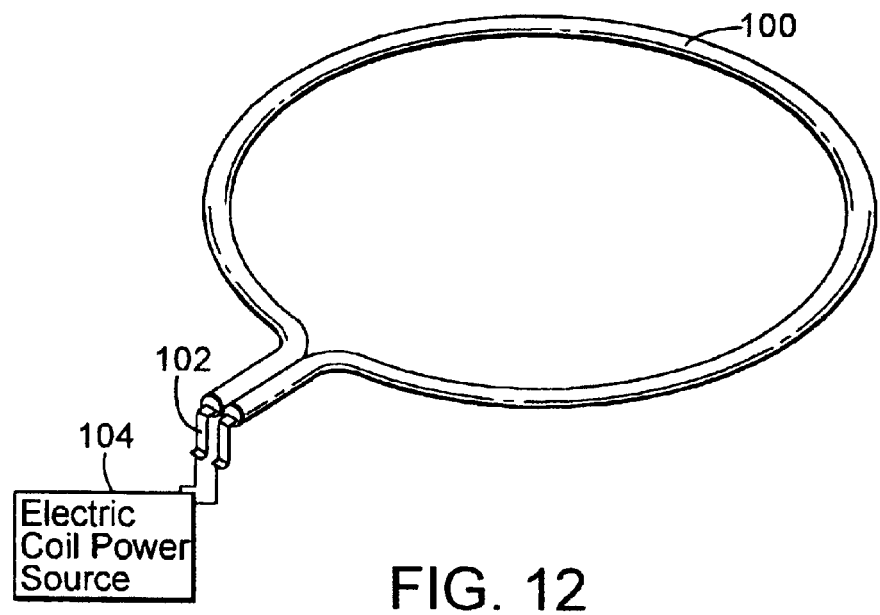
FIG. 12 is an illustration of one exemplary embodiment of a resistive heater used for heating the outer holder of the injection molding apparatus in accordance with the present invention.
Figure 13:
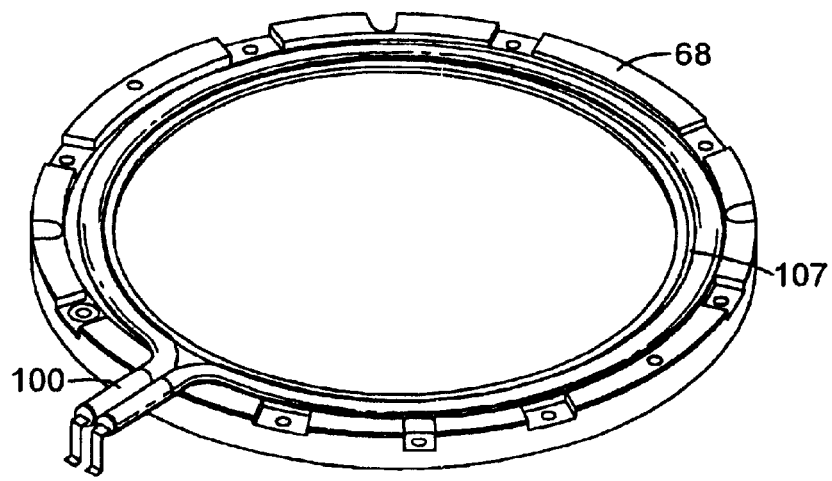
FIG. 13 is an illustration of an outer holder incorporating the resistive heater of FIG. 12.

FIG. 12 is an illustration of a resistive heater 100 and FIG. 13 is an illustration of the outer holder 68 incorporating the resistive heater of FIG. 12. By heating outer holder 68 during the injection molding process, a smaller temperature differential is created between optical disk 20 and outer holder 68, thereby reducing the heat transfer between optical disk 20 and outer holder 68. Thus, raising the temperature of outer holder 68 by only a few degrees has a beneficial effect towards reducing the "edge wedge" effect.

In the illustrated embodiment, the present invention incorporates a resistive heater 100 within an interior channel 107 of outer holder 68 to reduce heat transfer. In one preferred embodiment the resistive heater is made of copper, and more preferably is a CalRod resistive heater. The resistive heater 100 is electrically coupled to an electrical power source 104 via interface 102. The resistive heater 100 of the present invention provides a user a new degree of control in the optical disk injection molding process, as the resistive heater 100 can be controlled, or switched "on" and "off" during the molding process to facilitate better overall performance.

Figure 14:
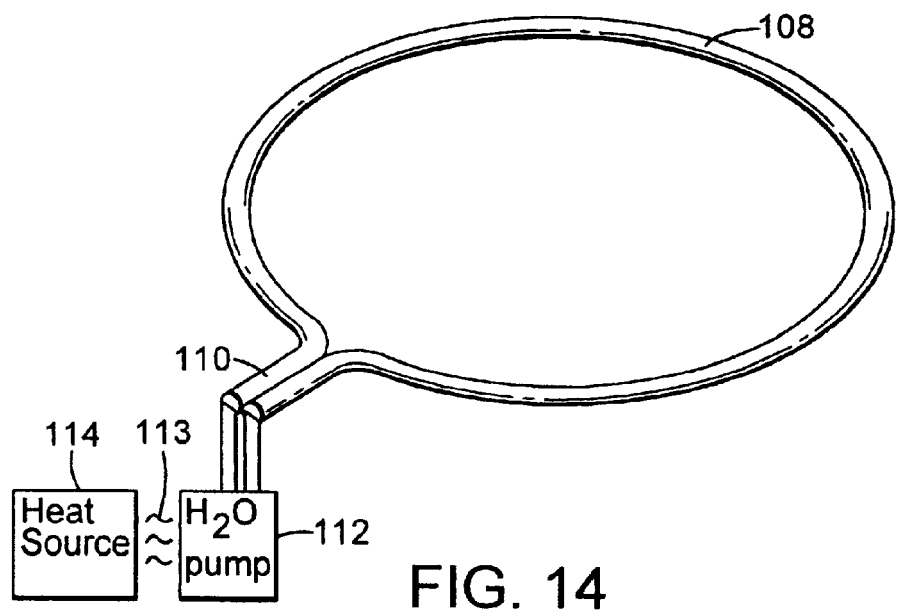
FIG. 14 is an illustration of one exemplary embodiment of a hollow coil which contains heated, recirculating water used for heating the outer holder of an injection molding apparatus in accordance with the present invention.
Figure 15:
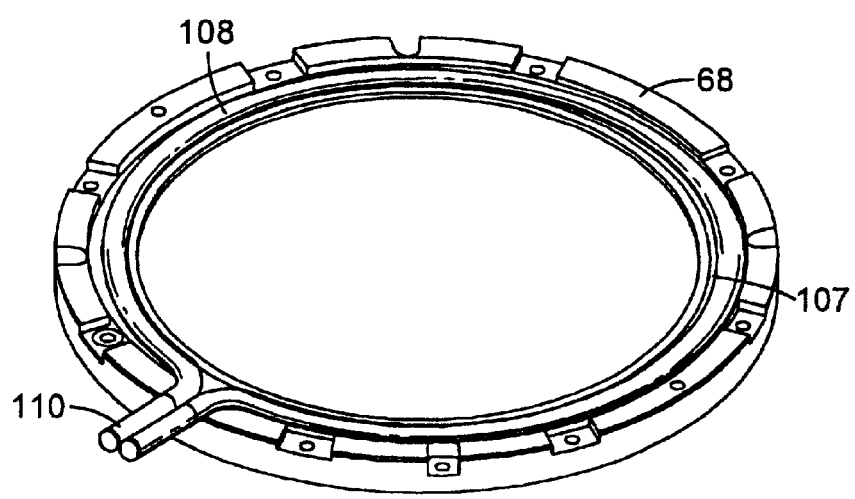
FIG. 15 is an illustration of an outer holder incorporating the heated recirculating water coil of FIG. 14.

In another embodiment, a heated fluid may be used to heat outer holder 68. FIG. 14 is an illustration of a hollow coil 108 which contains heated, recirculating water, and FIG. 15 is an illustration of outer holder 68 incorporating the heated recirculating water coil 108 of FIG. 14 within an interior channel 107.

In the illustrated embodiment, the heated recirculating water coil 108 serves the same purpose as the resistive heater (FIG. 12 and FIG. 13, element 100), namely to reduce heat transfer from the outer perimeter of the optical disk 20 to the outer holder 68. In this embodiment, the heated recirculating water coil 108 is connected to water pump 112 via interface 110. A heat source 114 serves to heat the water in the water pump reservoir before it is recirculated through interior channel 107 of outer holder 68. As with the resistive heater embodiment shown in FIGS. 10 & 11, the heated recirculating water coil 108 of the present invention provides a user with a new degree of control in the optical disk injection molding process, as the temperature of water passing through the heated recirculating water coil 108 can be precisely controlled during the molding process to facilitate better overall performance.

Figure 16:
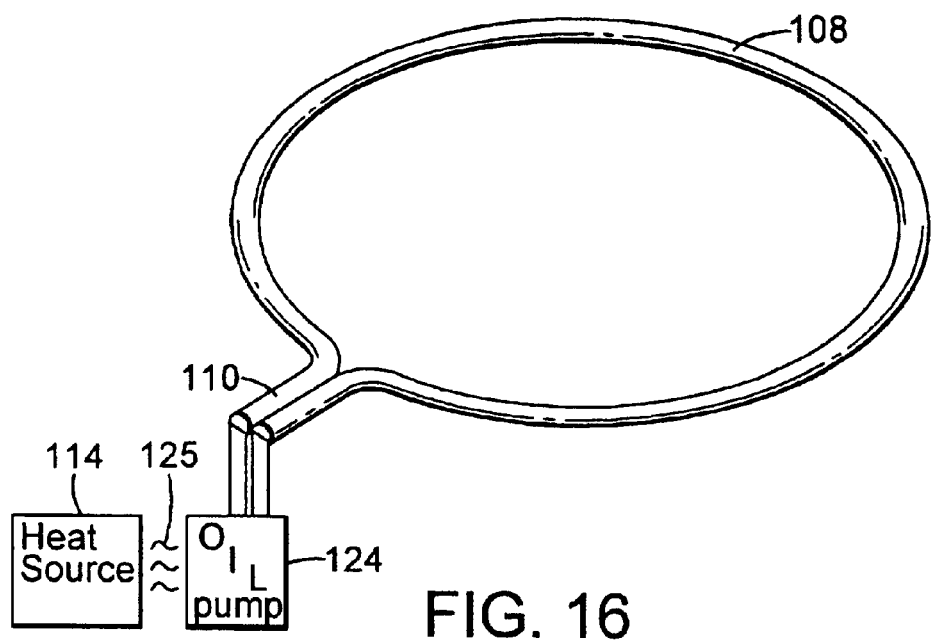
FIG. 16 is an illustration of one exemplary embodiment of a hollow coil which contains heated, recirculating oil used for heating the outer holder of an injection molding apparatus in accordance with the present invention.
Figure 17:
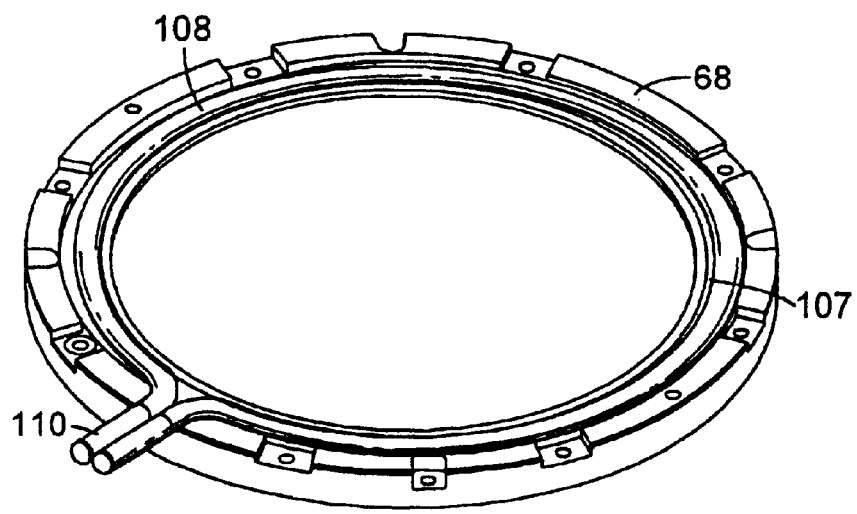
FIG. 17 is an illustration of an outer holder incorporating the heated recirculating oil coil of FIG. 14.

FIG. 16 is an illustration of a hollow coil 108 which contains heated, recirculating oil, and FIG. 17 is an illustration of outer holder 68 incorporating the heated recirculating oil coil 108 of FIG. 16 within an interior channel 107.

In the illustrated embodiment, the heated recirculating oil coil 108 serves the same purpose as the resistive heater (FIG. 12 and FIG. 13) and the heated recirculating water coil (FIG. 14 and FIG. 15), namely to reduce heat transfer from the outer perimeter of the optical disk 20 to the outer holder 68. In this embodiment, the heated recirculating oil coil 108 is connected to oil pump 112 via interface 110. A heat source 114 serves to heat the oil in the oil pump reservoir before it is recirculated through interior channel 107 of outer holder 68. As with the heated recirculating water coil embodiment shown in FIGS. 14 and 15, the heated recirculating oil coil 108 of the present invention provides a user with a new degree of control in the optical disk injection molding process, as the temperature of oil passing through the heated recirculating oil coil 108 can be precisely controlled (e.g., using a control mechanism) during the molding process to facilitate better overall performance.

Figure 18:
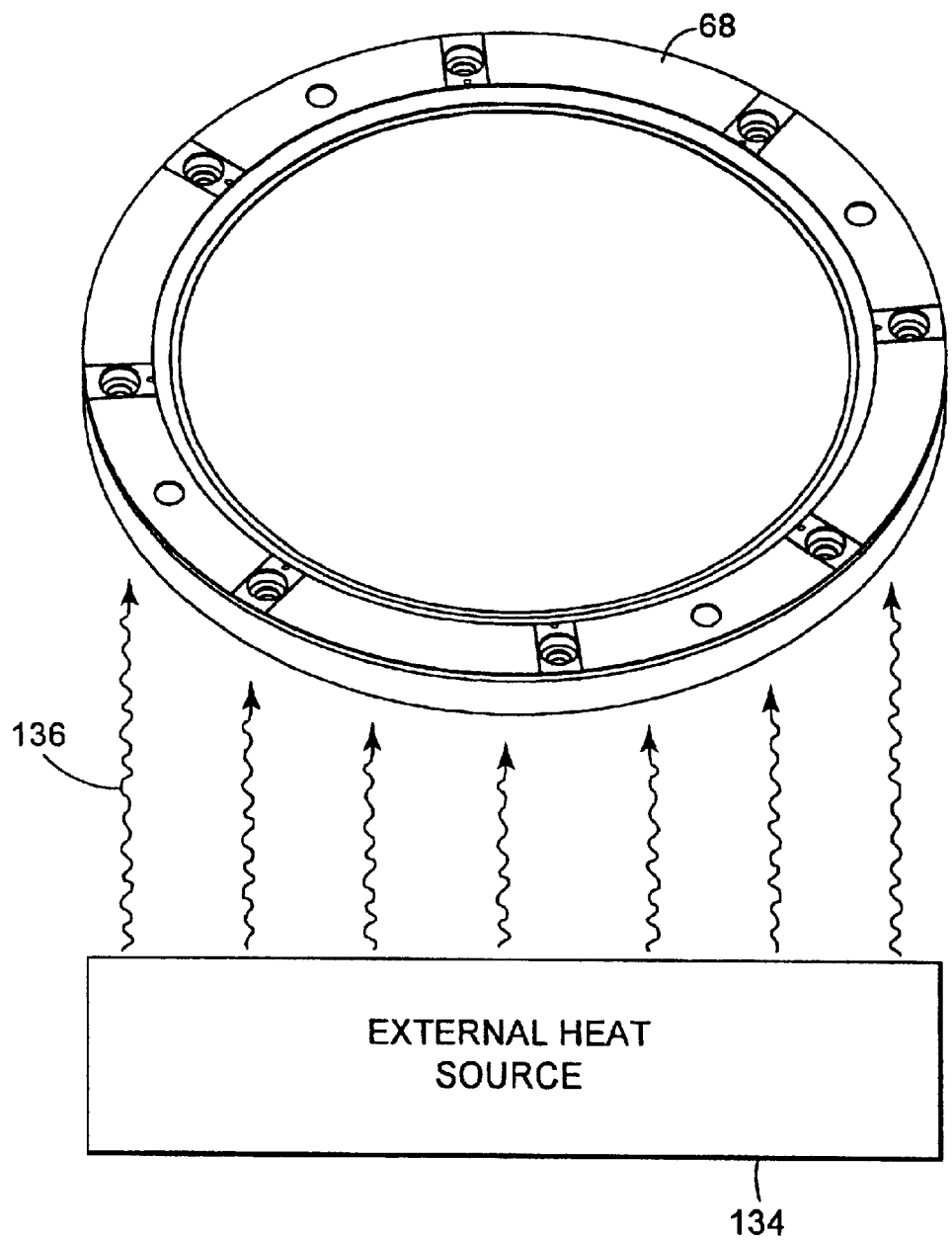
FIG. 18 is an illustration of one exemplary embodiment of an outer holder of an injection molding apparatus in accordance with the present invention wherein the outer holder is heated inductively by an external heat source.

FIG. 18 is an illustration of outer holder 68, wherein outer holder 68 is heated inductively by an external heat source 134. In this embodiment, outer holder 68 is heated through indirect, non-contact heating, as shown at 136. Unlike the other forms of heating described above, inductive heating may not be precisely directed to heat only outer holder 68. Rather, inductive heating may raise the temperature of additional components within the injection molding apparatus 42, and also molding cavity 48. As with the other heated outer holder 68 embodiments described above, this embodiment raises the temperature of outer holder 68, thus decreasing the temperature differential between the molten polycarbonate and outer holder 68. This serves to reduce the edge wedge effect in the resultant optical disk 20.

Figure 19:
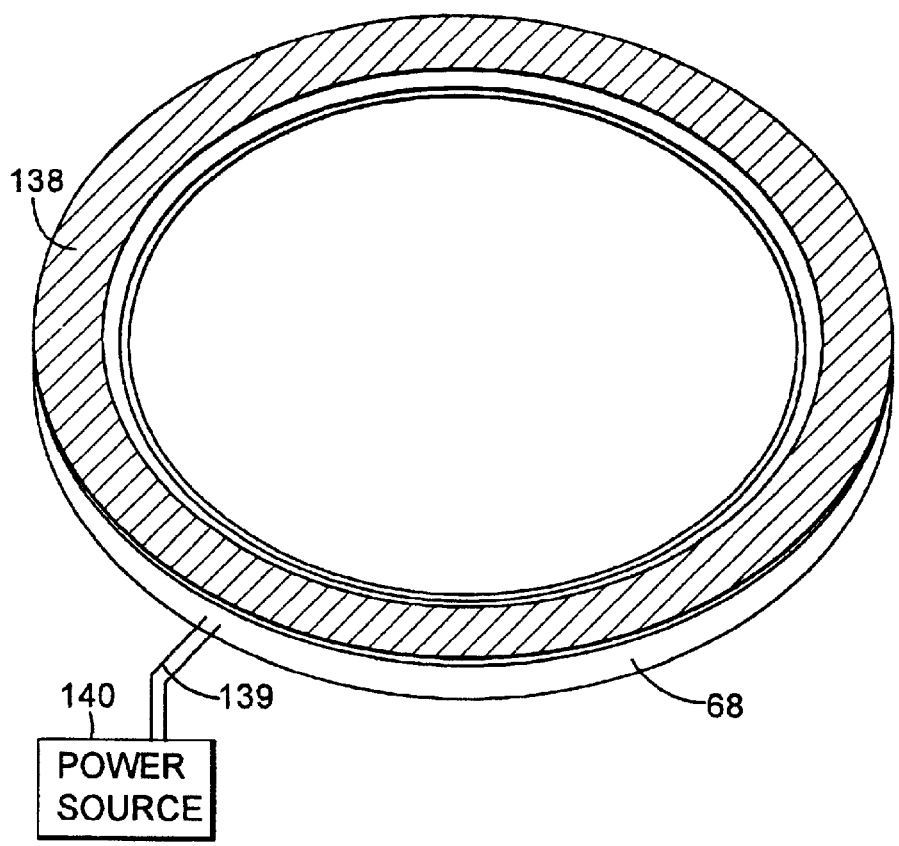
FIG. 19 is an illustration of one exemplary embodiment of an outer holder of an injection molding apparatus having a film dispersed on the outer surface of the outer holder, wherein the outer holder is heated thermoelectrically by the film element.

FIG. 19 is an illustration of outer holder 68 having a surface mount, film resistive heater 138 dispersed on the surface of outer holder 68, wherein outer holder 68 is heated thermoelectrically by film resistive heater 138. Film resistive heater 138 is electrically coupled to an electrical power source 140 via interface 139. Resistive heater 138 may comprise a relatively "thick" film or "thin" film resistive heater. As with the other heated outer holder 68 embodiments described above, this embodiment raises the temperature of outer holder 68, thus decreasing the temperature differential between the molten polycarbonate and outer holder 68. This serves to reduce the edge wedge effect in the resultant optical disk 20.

Figure 20:
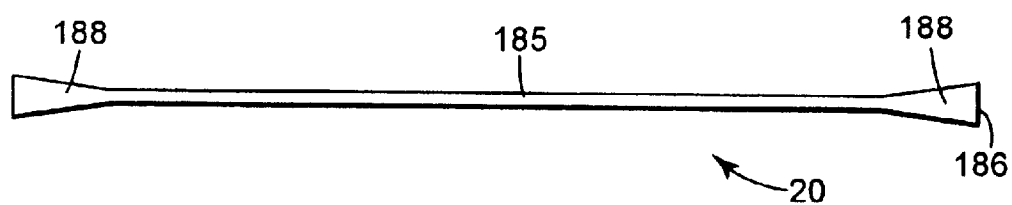
FIG. 20 is a cross sectional view of a prior art optical disk substrate molded using a conventional mold cavity, wherein the "edge wedge" effect is seen at the outer edges of the optical disk.

FIG. 20 is a cross sectional view of a prior art optical disk 20 molded using a conventional mold cavity, wherein the "edge wedge" effect 188 is seen at the outer edges of the optical disk 20. As mentioned in detail above, edge wedge is a phenomenon that occurs on the surface of optical disks 20 such that the thickness of optical disk 20 increases near the outside edge of the optical disk, as shown at 188. The wedge starts approximately 10 mm from an outside edge 186 of optical disk 20 and continues to increase in height until outside edge 186 of optical disk 20 is reached. At outside edge 186 of optical disk 20, the width of the disk is approximately 20 microns greater than the width at an interior region 185 of optical disk 20. Head crashes occur when a read/write head is in the region of the "edge wedge" effect 188. For the head not to crash, it must stay out of the wedge region. This makes the "edge wedge" region 188 of optical disk 20 unusable for data storage and thus limits data capacities of optical disks 20.

Figure 21:
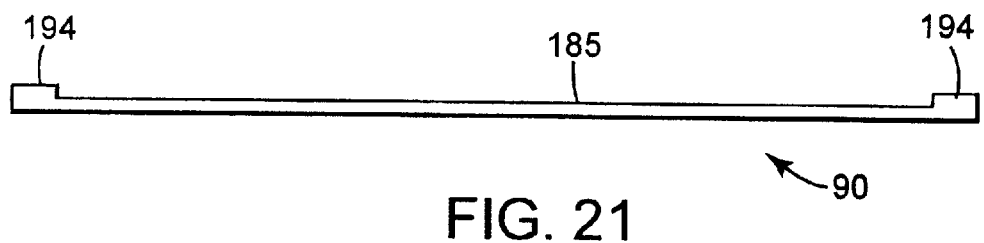
FIG. 21 is a cross sectional view of an improved optical disk with an enhanced useable surface area molded using the outer diameter wedge containment mold of the present invention.

FIG. 21 is a cross sectional view of an improved optical disk 190 having an enhanced surface area, molded using an outer diameter wedge containment mold of the present invention. The wedge containment mold addresses the problem of "edge wedge" by providing rectangular areas at the edges of the wedge containment mold for the wedge to "flow" into, as shown at 194. Unlike the gradually sloping characteristic of the conventional "edge wedge" effect 188, the wedge containment mold moves the "edge wedge" effect closer to the edge of optical disk 190, in a steeper slope profile, as seen at 194, thus providing more usable surface area on optical disk 190. The total surface area of the wedge containment mold is less than a conventional containment mold, thus reducing the effective area in which the "edge wedge" effect can be exhibited. Improved optical disks 190 formed from wedge containment mold allow the read/write head to fly much closer to the outer edge of optical disk 190 and thus allow for increased data capacities.

Figure 22:
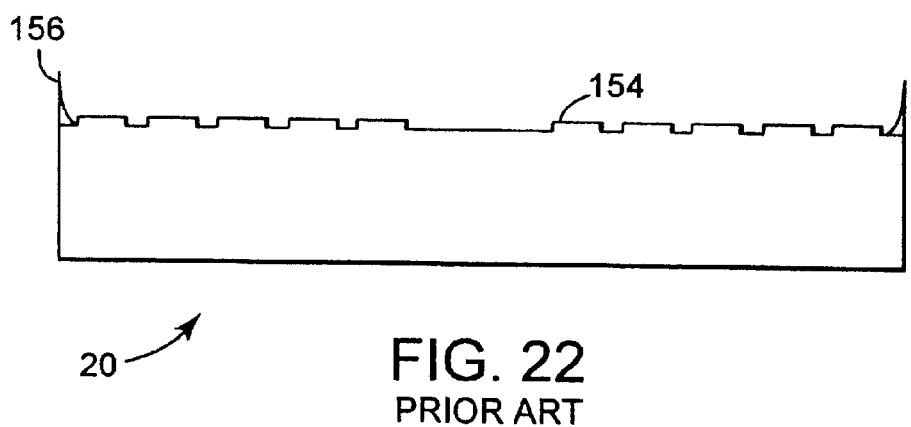
FIG. 22 is a cross sectional view of a molded optical disk substrate exhibiting the "edge wedge" effect at the outer edges of the substrate.

FIG. 22 is a cross sectional view of a prior art molded optical disk substrate 20 exhibiting the "edge wedge" effect 156 at the outer edges of substrate 20. In the process of molding optical disk substrate 20, molten polycarbonate is injected into substrate cavity 48 formed by stamper 62 on one side and fixed mirror block on the other side, as shown in FIG. 6. Heated polycarbonate is injected at gate 63 located at the center of the substrate cavity 48, as also shown in FIG. 6. Typical optical substrates 20 are molded to 120–130 millimeters in diameter and 1.2–2.0 mm in thickness. Ideally, the information surface of stamper 62 and fixed mirror block 44 are parallel. However, when measurements of the thickness of the optical disk substrate 20 are made, the outside edge of the disk is 15 to 25 microns thicker than the thickness of the disk 3 millimeters in from the outside edge. The edge thickness change depends on substrate thickness as well as molding parameters, in particular, mold temperature. As stated earlier, even though the thickness can be influenced by molding parameters and disk size, all injection molded optical disks 20 have the edge thickness ("edge wedge") effect 156.

Figure 23:
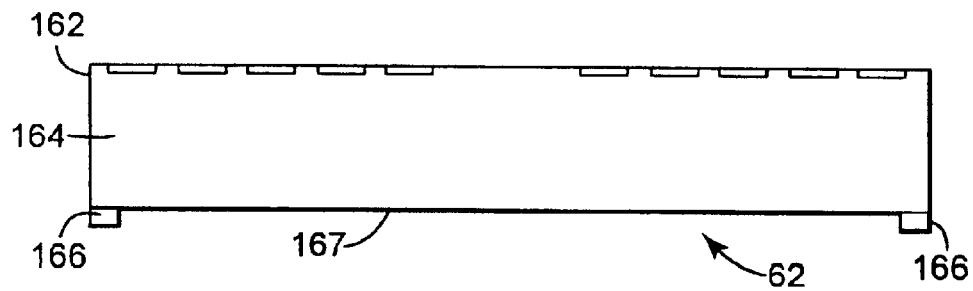
FIG. 23 illustrates an anti-wedge stamper of the present invention, wherein an electroplated nickel lip is added to the outer perimeter of the back side of the stamper.

FIG. 23 illustrates an anti-wedge stamper 62 of the present invention, wherein lip 166, preferably an electroplated nickel lip, is added to the outer perimeter of the back side 167 of a stamper 160. Stamper 62 is initially plated to a thickness of 280 microns. Stamper 62 is then removed from the electroplating bath and a series of masks from 127 mm to 130 mm are adhered to back side 167 of stamper 162. In a preferred embodiment, the best results are obtained using a laser cut 130 mm mask. After the mask is adhered to the plated nickel back side 167 of stamper 62, stamper 62 is reinserted into the electroplating path and the non-masked area is plated with an additional 15 microns of nickel, thus producing a 3 mm wide lip 166 around the outside perimeter of back side 167 of stamper 62. Stamper 62 is then polished, punched to size and cleaned as normal.

Figure 24:
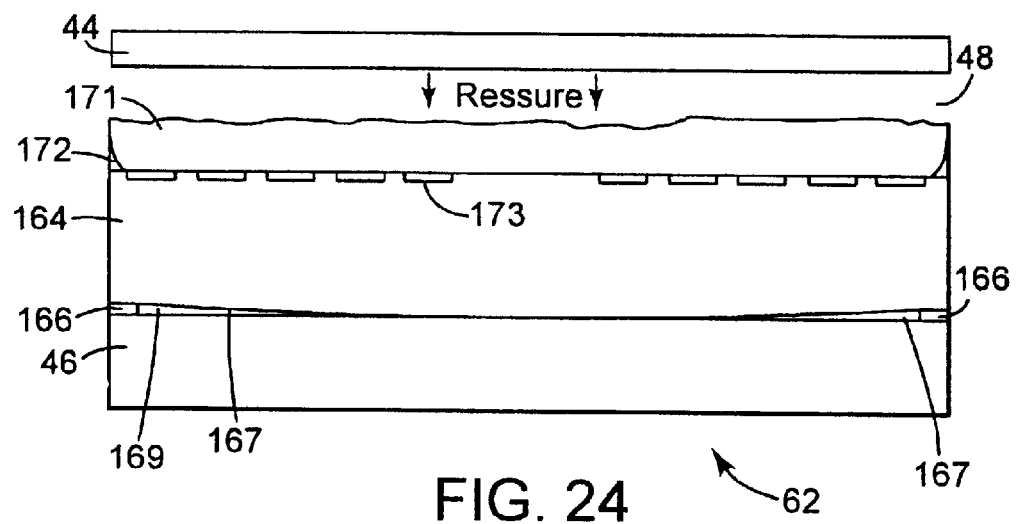
FIG. 24 illustrates the anti-wedge stamper of the present invention, wherein the stamper flexes during the injection molding process such that the outer edges of the stamper deflect upwardly in an anti-wedge configuration.

FIG. 24 illustrates anti-wedge stamper 62 of the present invention, wherein stamper 62 flexes during the injection molding process such that the outer edges of stamper 62 deflect upwardly in an anti-wedge configuration.

After lip 166 has been formed on the back side 167 of stamper 62, stamper 62 is inserted into the injection molding apparatus (FIG. 6, element 42). Under the pressure of injecting polycarbonate 171 into molding cavity 48, back side 167 of stamper 62 is pressed tightly against moving side mirror block 46. However, back side 167 of stamper 62 adjacent to lip 166 cannot be pressed tightly to the bottom mirror block, and forms an arc or shape which counters the "edge wedge" effect created by the injection molding process, as shown at 169. Mold cavity 48 is shaped by fixed side mirror block 44 and an information surface 173 of stamper 62. With the anti-wedge effect of stamper 62 now in effect, molding cavity 48 is narrower at the outside by approximately 15 microns. This reduction in cavity thickness at the outside edge of molding cavity 48 counters the inherent "edge wedge" effect, resulting in a molded optical disk having a top surface 154 that is flat to the edge, as shown in element 180 of FIG. 25. The "edge wedge" has now been substantially reduced or eliminated, as shown at 182.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed.

What is claimed is:

1. A disk molding apparatus for forming an optical disk in a disk molding process, wherein the apparatus reduces the edge wedge effect in the molded optical disk, the disk molding apparatus comprising:

a disk substrate cavity for forming a disk substrate therein, the disk substrate cavity including a first major surface, a second major surface which opposes the first major surface, and an outer edge;

a channel mechanism in fluid communication with the disk substrate cavity for allowing disk molding material to enter the disk substrate cavity;

a stamper located on at least one side of the disk substrate cavity for forming a formatted surface relief pattern in the disk substrate; and a thermal inhibiting mechanism located about the outer edge, wherein the thermal inhibiting mechanism includes a heater, and a control mechanism to control the heater such that the thermal inhibiting mechanism inhibits heat flow in the radial direction from the disk substrate toward an outer perimeter of the disk substrate during cooling of the disk molding material to form the disk substrate.

2. The disk molding apparatus of claim 1, wherein the heater is a resistive heater.

3. The disk molding apparatus of claim 1, wherein the heater is a fluid coil.

4. The disk molding apparatus of claim 3, wherein the heater is a water coil.

5. The disk molding apparatus of claim 3, wherein the heater is an oil coil.

6. The disk molding apparatus of claim 1, wherein the thermal inhibiting mechanism includes so outer holder and the heater is an external heat source that heats the outer holder through indirect non-contact heating.

7. The disk molding apparatus of claim 1, wherein the heater is a surface mount resistive heater.

* * * * *